Feb. 22, 1938.    F. L. MAIN ET AL    2,109,013
BRAKE MECHANISM
Filed June 29, 1936
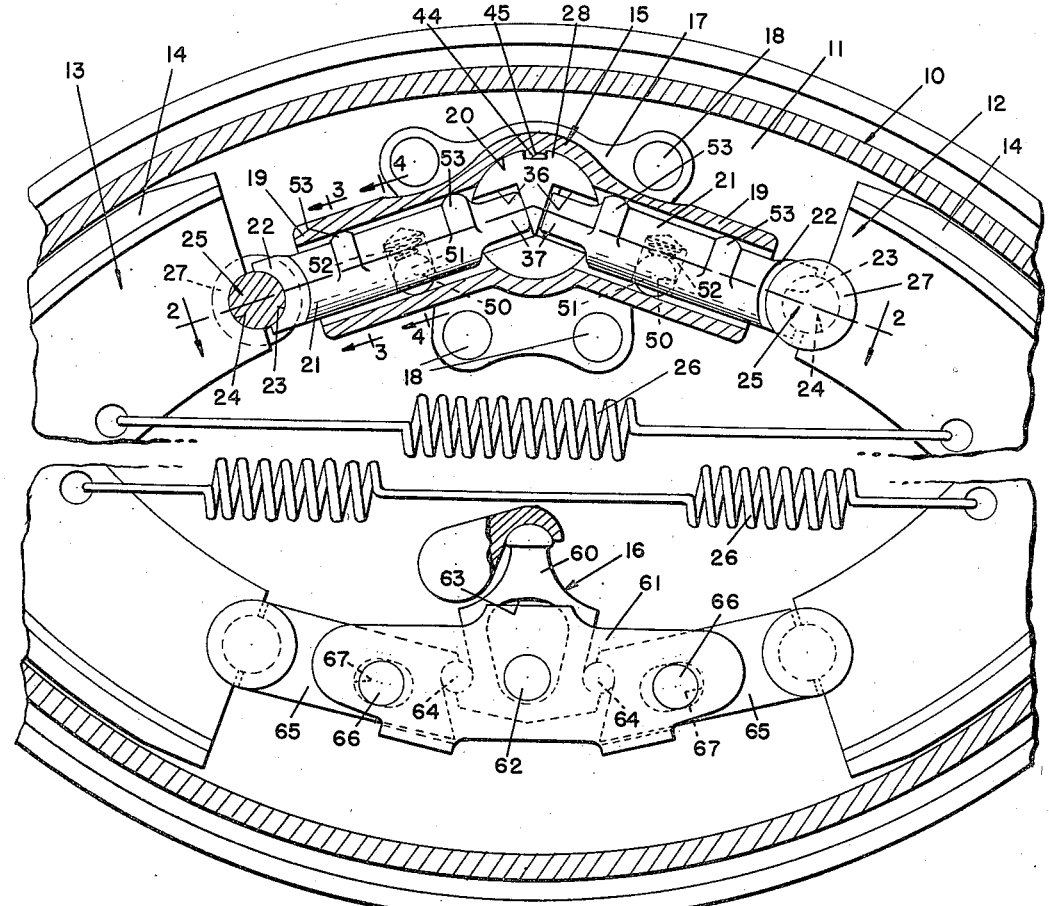
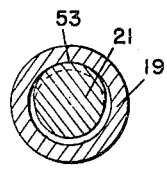
FIG.3.
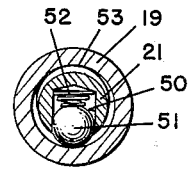
FIG.4.
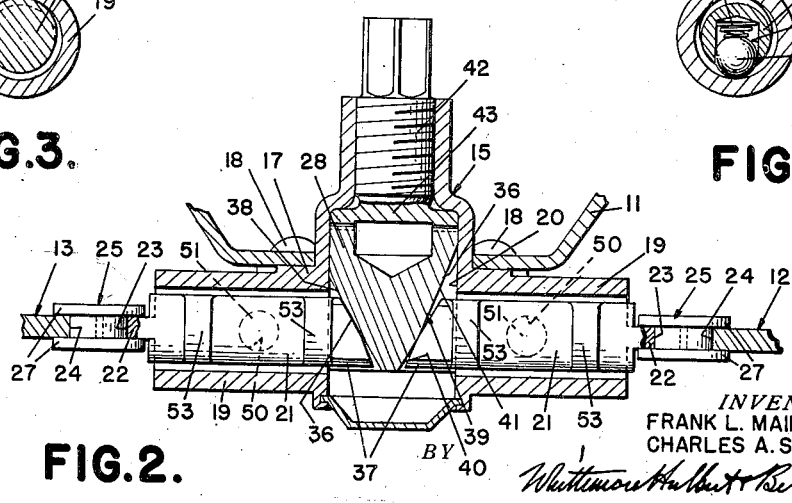
FIG.2.
INVENTORS
FRANK L. MAIN
CHARLES A. SAWTELLE
BY Whittemore Hulbert & Belknap
ATTORNEYS Patented Feb. 22, 1938

2,109,013

UNITED STATES PATENT OFFICE 2,109,013

BRAKE MECHANISM

Frank L. Main, Birmingham, and Charles A. Sawtelle, Detroit, Mich., assignors to Kelsey-Hayes Wheel Company, Detroit, Mich., a corporation of Delaware Application June 29, 1936, Serial No. 88,004

19 Claims. (Cl. 188—79.5)

This invention relates generally to brake mechanisms and refers more particularly to adjustment anchor devices for the brake friction means.

The present invention contemplates more specifically brake mechanism embodying an adjustment anchor device of the type having a wedge supported for axial movement between spaced ends of the friction means and operatively connected to the latter ends by means of adjustment links slidably supported within tubular extensions of the wedge retainer. In brake mechanisms of the above type, it is not only desirable to provide for limited tilting movement of the adjustment links in a plane substantially at right angles to the axis of the brake drum in order to permit a slight shifting movement of the friction means relative to the brake flange, but in addition, to prevent tilting movement of the adjustment links during adjustment so that lost motion between the wedge and friction means is reduced to the minimum. It is, therefore, one of the principal objects of the present invention to provide means for yieldably resisting tilting movement of the adjustment links during adjustment of the wedge.

Another advantageous feature of the present invention resides in the novel means provided herein for minimizing the friction of the adjustment device. This is accomplished in the present instance by reducing the area of contact of the adjustment links with the tubular extensions of the wedge retainer.

In addition to the foregoing, the present invention contemplates means insuring proper location of the wedge in the retainer during assembly. This feature is of particular importance in the instances where the wedge is not symmetrical, as is the case in brake mechanisms embodying a wedge having differently inclined sides for effecting differential adjustment of the primary and secondary portions of the brake friction means.

The above, as well as other objects, will be made more apparent as this description proceeds, especially when considered in connection with the accompanying drawing, wherein:

Figure 1 is a fragmentary side elevational view partly in section of brake mechanism constructed in accordance with this invention;

Figure 2 is a sectional view taken substantially on the plane indicated by the line 2—2 of Figure 1;

Figure 3 is a cross sectional view taken substantially on the plane indicated by the line 3—3 of Figure 1; and Figure 4 is a cross sectional view taken substantially on the plane indicated by the line 4—4 of Figure 1.

The brake mechanism illustrated in Figures 1 to 4 inclusive, comprises a brake drum 10, a backing plate 11, and a pair of brake shoes 12 and 13 supported within the drum in a manner to be presently described. The brake shoes are substantially T-shaped in cross section with the head of the T located adjacent the brake flange of the drum and having a friction lining 14 secured to the exterior surface thereof for engagement with the inner surface of the brake flange.

Upon reference to Figure 1, it will be noted that the upper ends of the brake shoes are spaced from each other and are anchored to the backing plate 11 through the medium of an adjustment device 15 located between the upper extremities of the two shoes. It will also be observed from the above figure, that the lower ends of the brake shoes are spaced from each other a sufficient distance to receive therebetween an actuator 16 operatively connected to the adjacent ends of the shoes for moving the latter into frictional engagement with the brake flange of the drum.

The adjustment anchor device 15 comprises an anchor bracket 17 fixedly secured to the backing plate by means of the fastener elements 18 and having radially inwardly inclined tubular extensions 19 communicating at the inner ends thereof with an axially extending bore 20. The tubular extensions 19 of the bracket are located within the brake drum and the portion of the bracket provided with the bore 20 extends rearwardly from the drum through an opening in the backing plate 11.

Each of the tubular extensions 19 of the anchor bracket slidably receive an adjustment link 21 having the outer ends thereof extending beyond the tubular portions 19 and provided with head portions 22. The outer extremities of the head portions 22 are formed with recesses 23 therein and the adjacent ends of the web portions of the shoes are correspondingly recessed, as at 24, to cooperate with the recesses 23 in receiving the shank portions of suitable pins 25. The walls of the recesses 23 and 24 are maintained in abutting relationship with the shanks of the pins 25 by means of the brake shoe retraction springs 26 connecting the shoes on opposite sides of the axis of the drum. It will also be noted from Figure 2 that the pins 25 are provided with enlarged heads 27 at opposite ends of the shank portions, cooperating with each other to prevent axial displacement of the pins and to maintain the web portions of the shoes in alignment with the heads 22 of the adjustment links 21.

For adjusting the links 21 to vary the clearance between the friction surface 14 of the shoes and the adjacent face of the brake flange, we have provided a wedge 28 located in the bore 20 of the anchor bracket between the inner end portions of the adjustment links 21. It will be observed from Figure 1 that the wedge has a cylindrical body portion slidably engaging the inner walls of the bore 20, and is provided with diametrically opposed grooves 36 for loosely receiving the inner flattened end portions 37 of the adjustment links. The grooves 36 have bottoms 38 and 39 which are inclined relative to the axis of the wedge and which are engageable with the inner ends of the adjustment links. The bottom 39 has the lower end portion 40 inclined at the same angle as the bottom 38, and the upper end portion inclined at a smaller angle. The arrangement is such that when the ends of the adjustment links engage the lower end portions of the wedge, both brake shoes are correspondingly positioned relative to the adjustment anchor device and their friction linings may be properly ground. This grinding operation is performed during the manufacture and prior to the assembly with the brake drum and backing plate. However, after assembly, axial inward adjustment of the wedge positions the latter so that the adjustment link for the secondary shoe 12 engages the portion 41 of the bottom 39, and the adjustment link for the primary shoe engages the bottom 38 of the groove at the opposite side of the wedge. It necessarily follows, therefore, that axial adjustment of the wedge advances the adjustment link for the primary shoe at a greater rate than the adjustment link for the secondary shoe. The angles of the bottom 38 and the portion 41 of the bottom 39 are predetermined in accordance with the approximate rate of wear of the friction linings of the primary and secondary shoes, so that adjustment of the anchor device compensates for the wear and provides equal clearance between the shoes and the drum. It may be pointed out at this time that the inner end of the adjustment link for the secondary shoe is provided with angular surfaces complementary to the angularly disposed portions 40 and 41 of the bottom 39 so that the change of rate will be effected gradually.

Axial movement of the wedge 28 in the bore 20 to effect the above adjustment of the brake shoes, is accomplished from a point exteriorly of the brake drum by means of a screw 42 threadedly mounted in a reduced extension of the bore 20. The screw 42 has at its inner end the enlarged head 43 which is of approximately the same diameter as the wedge 28 and which is engageable with the rear face of the wedge. In this connection, it will be noted that the front face of the head 43 and the rear face of the wedge 28 are formed with cooperating projections and recesses serving to not only lock the screw from accidental turning, but to also indicate predetermined increments of adjustment.

It will be noted from the foregoing that it is important to assemble the wedge 28 in the bore 20 with the bottom 39 positioned for engagement with the inner end of the adjustment link for the secondary shoe. In order to avoid any possibility of incorrectly assembling the wedge 28 in the bore 20, we provide an axially extending key 44 on the anchor bracket in the bore 20 for engagement within a recess 45 in the wedge 38.

The arrangement is such that the recess 45 in the wedge must be aligned with the key 44 in the bore in order to assemble the wedge in the bore and when this condition exists, the bottom 39 assumes a position for engagement with the inner end of the adjustment link for the secondary shoe.

It has previously been stated that in brakes of the general type defined herein, it is desirable to provide for limited shifting movement of the brake shoes circumferentially of the drum. This shifting movement is permitted at the adjustment ends by reason of the fact that the internal diameter of the tubular extensions 19 is sufficiently greater than the diameter of the adjustment links to permit the latter to tilt in the tubular extensions in a plane substantially perpendicular to the axis of the brake drum. In this connection, attention is particularly directed to Figure 1, wherein the diameter of the tubular extensions is not only shown as greater than the diameter of the adjustment links, but wherein the grooves in the wedge 28 for receiving the inner flattened ends of the adjustment links are shown as being of sufficient width to permit the necessary tilting movement of the links.

Although tilting movement of the adjustment links in the anchor bracket is desirable to secure the limited circumferential shifting movement of the brake shoes relative to the brake drum, nevertheless, this tilting movement is objectionable in that it has a tendency to introduce a certain amount of lost motion between the wedge 28 and the adjacent ends of the brake shoes. This objection is overcome in the present instance by providing means for yieldably urging the adjustment links toward the radially outer sides of the tubular extensions, and this is accomplished in the following manner. Each of the adjustment links 21 is provided with a bore 50 extending at right angles to the axis of the link intermediate the ends of the latter and adapted to receive a ball 51. The balls 51 are retained in the bores 50 of the links by means of the radially inner side surfaces of the extensions 19 and are yieldably urged into frictional engagement with the aforesaid surfaces by means of springs 52 located in the bores 50 above the balls 51. Thus, it will be noted that the springs 52 act through the balls 51 to maintain the radially outer sides of the adjustment links into engagement with the corresponding sides of the extensions 19. This is true during adjustment of the wedge 28 and, accordingly, lost motion is reduced to the minimum. It will, of course, be understood from Figure 1 that the balls provide, in effect, a point contact between the radially inner sides of the adjustment links and the adjacent surfaces of the extensions 19. This not only appreciably reduces friction, but also facilitates tilting of the links about the balls 51.

The friction is further reduced by forming each of the adjustment links with a pair of enlargements 53 at equal distances on opposite sides of the ball and on the radially outer sides of the links. Although the enlargements 53 are shown in Figure 3 as having an extended circumferential engagement with the guides 10 in order to resist displacement of the links 21 in the tubular extensions 19 axially of the brake drum nevertheless, the peripheries of the enlargements are shown in Figure 1 as curved in the direction of the axes of the links to have the minimum area of contact with the adjacent surface of the tubular extensions 19 axially of the latter. It follows from the above that the sliding friction of the links 21 in the guides 19 is reduced to the minimum and, at the same time, sufficient contact of the enlargements 53 with the guides is provided to prevent displacement of the links 21 transversely to the axes of the guides.

Thus, from the foregoing, it will be observed that we have provided an adjustment anchor device embodying means permitting rocking movement of the adjustment links in a plane substantially perpendicular to the axis of the drum, without instituting lost motion between the adjustment wedge and the adjacent ends of the shoes. It will also be apparent that friction between the adjustment wedge and adjacent ends of the shoes is reduced to the minimum, and, in addition, that the adjustment links are supported for relatively free rocking movement in the anchor bracket in a plane extending substantially perpendicular to the axis of rotation of the drum.

The actuator 16 disposed between the lower ends of the brake shoes may be of any suitable construction capable of efficiently expanding the brake shoes into engagement with the brake flange of the drum. In the present instance, this actuator comprises a radially outwardly movable wedge 60 slidably supported on the backing plate 11 by means of a bracket 61 and secured in assembled relation by means of a pin 62 extending through an elongated opening 63 in the wedge. The opening 63 is elongated in the direction of movement of the wedge and gradually increases in width from the outer end thereof to permit the desired circumferential shifting movement of the wedge with the brake shoes. The opposite sides of the wedge are inclined in the manner shown for engagement with suitable rollers 64 which, in turn, are engaged by the inner ends of suitable links 65. The outer ends of the links 65 are operatively connected to the adjacent ends of the shoes in the same manner as the outer ends of the adjustment links, previously described, and the links are secured in assembled relation to the brackets 61 by means of the pins 66 extending through elongated slots 67 in the links. The rollers 64 are preferably freely supported between the opposite sides of the wedge and adjacent ends of the links to reduce friction to the minimum. Attention is also called to the fact that the disposition of the links 65 is such as to apply a force component to the brake shoes in the direction of the adjustment anchor device, and this is desirable in that it serves to more uniformly engage the lining 14 of the brake shoes with the brake flange. This is also true of the adjustment links, since the inclination of the same, shown in Figure 1, applies a force component, during adjustment, in the direction of the actuator and, therefore, insures a more uniform adjustment of the brake shoes relative to the brake flange.

What we claim as our invention is:

1. In a brake mechanism, the combination with a brake drum and brake shoes engageable with said drum and having spaced ends, of an adjustment anchor device for said shoes located between said ends, said device comprising adjustment links having the outer ends operatively connected to the ends aforesaid of the shoes, means engageable with the inner ends of the links for adjusting the latter, guides loosely receiving said links, and means acting directly on the links for preventing tilting movement of the links in the guides during adjustment of the links by said adjusting means.

2. In a brake mechanism, the combination with a brake drum and brake shoes engageable with said drum and having spaced ends, of an adjustment anchor device for said shoes located between said ends, said device comprising adjustment links having the outer ends operatively connected to the ends aforesaid of the shoes, means engageable with the inner ends of the adjustment links for moving the latter in the direction of their axes, guides receiving the links providing tilting movement of the links in a plane substantially perpendicular to the axis of the drum, and means carried by the links and cooperating with said guides to yieldably resist said tilting movement of the links during axial movement of said links by the adjusting means.

3. In a brake mechanism, the combination with a brake drum and brake shoes engageable with said drum and having spaced ends, of an adjustment anchor device for said shoes located between said ends, said device comprising adjustment links having the outer ends connected to the ends aforesaid of the shoes, an axially movable member engageable with the inner ends of the links for moving the same in the direction of their axes, guides receiving the links providing for tilting movement of the links in a plane substantially perpendicular to the axis of the drum, and yieldable means carried by the links intermediate the ends of the latter and engageable with portions of the guides at one side thereof for yieldably urging the links into frictional engagement with the portions of the guides at the opposite sides of the same.

4. In a brake mechanism, the combination with a brake drum and brake shoes engageable with said drum and having spaced ends, of an adjustment anchor device for said shoes located between said ends, said device comprising adjustment links having the outer ends connected to the ends aforesaid of the shoes, an axially movable member engageable with the inner ends of the links for moving the same in the direction of their axes, guides receiving the links providing for tilting movement of the links in a plane substantially perpendicular to the axis of the drum, and yieldable means carried by the adjustment links intermediate the ends thereof for engaging the radially inner sides of the guides to urge the links into frictional engagement with the radially outer sides of the guides.

5. In a brake mechanism, the combination with a brake drum and brake shoes engageable with said drum and having spaced ends, of an adjustment anchor device for said shoes located between said ends, said device comprising tubular guides, adjustment links loosely received in the guides and having axially spaced portions frictionally engaging the guides at one side thereof, means yieldably urging the axially spaced portions on the links into frictional engagement with the guides, means operatively connecting the outer ends of the links to the aforesaid ends of the shoes, and means engageable with the inner ends of the links for adjusting the same.

6. In a brake mechanism, the combination with a brake drum and brake shoes engageable with said drum and having spaced ends, of an adjustment anchor device for said shoes located between said ends, said device comprising tubular guides, links received by the guides and having axially spaced portions frictionally engaging the radially outer sides of the guides, yieldable means located between the axially spaced portions and engaging the radially inner sides of the guides for urging said axially spaced portions of the links into frictional engagement with the guides, means operatively connecting the outer ends of the links to the ends aforesaid of the shoes, and means engageable with the inner ends of the links for adjusting of the latter.

7. In a brake mechanism, the combination with a brake drum and brake shoes engageable with said drum and having spaced ends, of an adjustment anchor device for said shoes located between said ends, said device comprising links having the outer ends operatively connected to the ends aforesaid of the shoes, means engageable with the inner ends of the links for adjusting the same, guides loosely receiving the links, means carried by the links and cooperating with said guides to yieldably resist rocking movement of the links in a plane substantially perpendicular to the axis of the drum, and means preventing transverse rocking movement of the links in the guides.

8. In a brake mechanism, the combination with a brake drum and brake shoes engageable with said drum and having spaced ends, of an adjustment anchor device for said shoes located between said ends, said device comprising tubular guides, adjustment links loosely received by said guides and each link having a recess intermediate the ends thereof, a ball loosely received in each recess, yieldable means urging the balls into engagement with the guides at one side thereof, means operatively connecting the outer ends of the adjustment links to the ends aforesaid of the shoes, and means engageable with the inner ends of the links for adjusting the latter.

9. In a brake mechanism, the combination with a brake drum and brake shoes engageable with said drum and having spaced ends, of an adjustment anchor device for said shoes located between said ends, said device comprising adjustment links having the outer ends operatively connected to the ends aforesaid of the shoes, guides loosely receiving the links, means supporting the links in the guides for rocking movement relative thereto in a plane substantially perpendicular to the axis of the drum, means engageable with the inner ends of the links for adjusting the latter, and means free from direct connection with the shoes for resisting rocking movement of the links during adjustment of the same.

10. In a brake mechanism, the combination with a brake drum and brake shoes engageable with said drum and having spaced ends, of an adjustment anchor device for said shoes located between said ends, said device comprising adjustment links having the outer ends operatively connected to the ends aforesaid of the shoes, guides telescopically receiving said links and providing rocking movement of the links in a plane substantially perpendicular to the axis of the drum, means intermediate the ends of the links at the radially inner sides of the latter engageable with adjacent surfaces of the guides for rockably supporting the links in the latter, and yieldable means acting upon the last named means for maintaining the radially inner sides of the links spaced from the adjacent surfaces of the guides and for frictionally urging radially outer side portions of the links into engagement with the adjacent surfaces of the guides.

11. In a brake mechanism, the combination with a brake drum and brake shoes engageable with said drum and having spaced ends, of an adjustment anchor device for said shoes located between said ends, said device comprising adjustment links having their outer ends operatively connected to the ends aforesaid of the shoes, guides telescopically engaging the links and providing rocking movement of the links in a plane perpendicularly to the axis of the brake drum, an insert carried by each link intermediate the ends for sliding movement transversely of the axes of the links and having a spherical portion engaging the guides at the radial inner sides thereof, and yieldable means acting upon the inserts to maintain the radially inner sides of the links spaced from the adjacent surfaces of the guides and to urge radially outer portions of the links into frictional engagement with the surfaces of the guides adjacent thereto.

12. In a brake mechanism, the combination with a brake drum and brake shoes engageable with said drum and having spaced ends, of an adjustment anchor device for said shoes located between said ends, said device comprising tubular guides, adjustment links loosely received in the guides and having axially spaced portions projecting from the radially outer sides thereof for engagement with the adjacent surfaces of the guides, an insert carried by each link intermediate said axially spaced portions for sliding movement transversely to the axes of the links and having spherical portions engaging the radially inner sides of the guides, and yieldable means urging the inserts in a direction toward the radially inner sides of said guides.

13. In a brake mechanism, the combination with a brake drum and brake shoes engageable with said drum and having spaced ends, of an adjustment anchor device for said shoes located between said ends, said device comprising a bracket, a longitudinally adjustable wedge carried by said bracket and having oppositely disposed differently inclined portions for adjusting the ends aforesaid of the shoes, and cooperating engaging means on the wedge and bracket compelling assembly of the wedge and bracket with the inclined portions of the wedge in predetermined relationship to the ends aforesaid of the shoes.

14. In a brake mechanism, the combination with a brake drum and brake shoes engageable with said drum and having spaced ends, of an adjustment anchor device for said shoes located between said ends, said device comprising a bracket member, a longitudinally adjustable wedge member carried by the bracket member and having oppositely differently inclined portions for adjusting said ends, and a longitudinally extending key on one of said members slidably engaging a recess in the other of said members for compelling assembly of the wedge and bracket members with the differently inclined portions on the wedge member in proper relationship to the ends aforesaid of the shoes.

15. In a brake mechanism, the combination with a brake drum and brake friction means engageable with said drum and having spaced ends, of means for adjusting the position of the brake friction means relative to the brake drum including an adjustment device located between said spaced ends of the friction means, said device comprising adjustment links having the outer ends operatively connected to the said ends of the friction means and rockable in a plane substantially perpendicular to the axis of the drum, means supported for movement relative to the links and engageable with the inner ends of said links for adjusting the latter to vary the position of the friction means relative to the brake drum, and means acting directly on the links for preventing tilting movement of the links in the aforesaid plane of rocking movement thereof during adjustment of the links by said adjusting means.

16. In a brake mechanism, the combination with a brake drum and brake friction means engageable with the brake drum and having spaced ends, of means for adjusting the brake friction means to vary the position of the latter relative to the drum including an adjustment device located between the ends of the friction means, said device comprising adjustment links having the outer ends operatively connected to the said ends of the friction means, means supported for movement transversely to the axes of the links between the inner ends of the latter and engageable with said inner ends for adjusting the links to vary the position of the friction means relative to the brake drum, guides supporting the links intermediate the ends for rocking movement in a plane substantially perpendicular to the axis of the drum, and means carried by the links and cooperating with the guides to yieldably resist tilting movement of the links in said plane by the adjustment means but permitting said tilting movement by the friction means.

17. In a brake mechanism, the combination with a brake drum and brake friction means engageable with said drum and having spaced ends, of means for adjusting the position of the friction means relative to the drum including an adjustment device located between the ends of the friction means, said device comprising a longitudinally movable member, guides positioned on opposite sides of the movable member, adjustment links supported on the guides and having axially spaced portions frictionally engaging the guides at one side thereof, means yieldably urging the axially spaced portions on the links into frictional engagement with the guides, means operatively connecting the outer ends of the links to the ends aforesaid of the friction means, and means for adjusting said longitudinally movable member relative to the inner ends of the links to effect an adjustment of the friction means relative to the drum through the medium of said links.

18. In a brake mechanism, the combination with a brake drum and brake friction means engageable with said drum and having spaced ends, of means for adjusting the brake friction means to vary the position of the latter relative to the brake drum including an adjustment device, said device comprising a member supported between the ends of the friction means for longitudinal movement, guides positioned on opposite sides of the member, adjustment links supported on the guides for rocking movement in a plane substantially perpendicular to the axis of the drum and having axially spaced portions frictionally engaging the guides at one side thereof, means yieldably urging the axially spaced portions on the links into frictional engagement with the guides and operable to resist rocking movement of the links in the plane aforesaid, means operatively connecting the outer ends of the links to the ends aforesaid of the friction means, and means for adjusting said longitudinally movable member to engage opposite sides of the latter with the inner ends of the links and thereby effect an adjustment of the friction means relative to the brake drum.

19. In a brake mechanism, the combination with a brake drum and brake friction means engageable with said drum and having spaced ends, of means for adjusting the position of the friction means relative to the brake drum including an adjustment device located between the ends of the friction means, said device comprising a support, a longitudinally adjustable wedge carried by the support and having oppositely disposed inclined portions for adjusting the ends of the friction means, said wedge being non-symmetrical, and cooperating engaging means on the wedge and support compelling assembly of the wedge and support with the opposite sides of the wedge in predetermined relationship to the ends of the friction means.

FRANK L. MAIN.
CHARLES A. SAWTELLE.